Nov. 10, 1936.  A. E. F. BILLSTEIN  2,060,458
RAIL FLAW DETECTOR
Filed Aug. 21, 1935   2 Sheets-Sheet 1
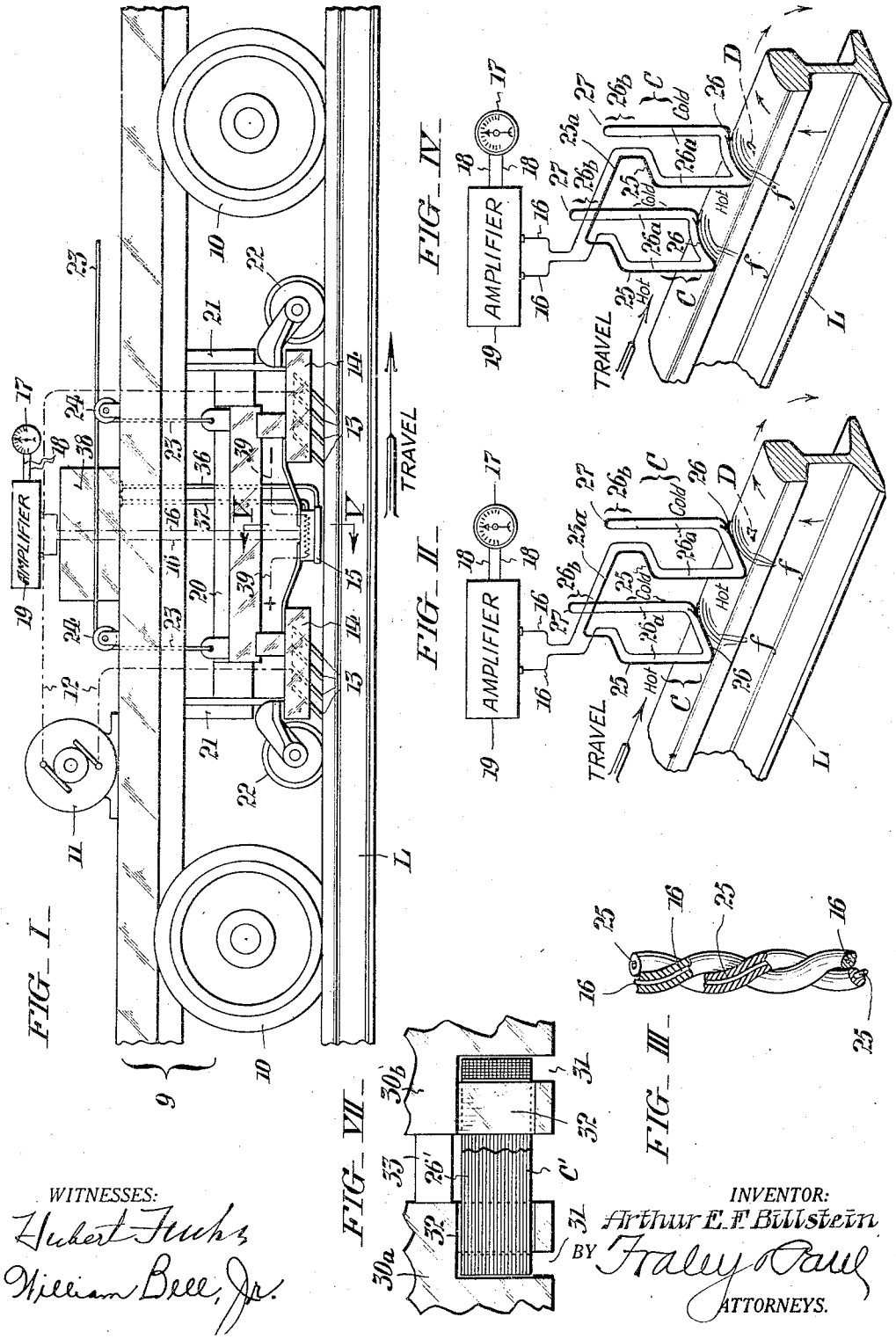
WITNESSES:
INVENTOR:
Arthur E. F. Billstein
BY
ATTORNEYS.

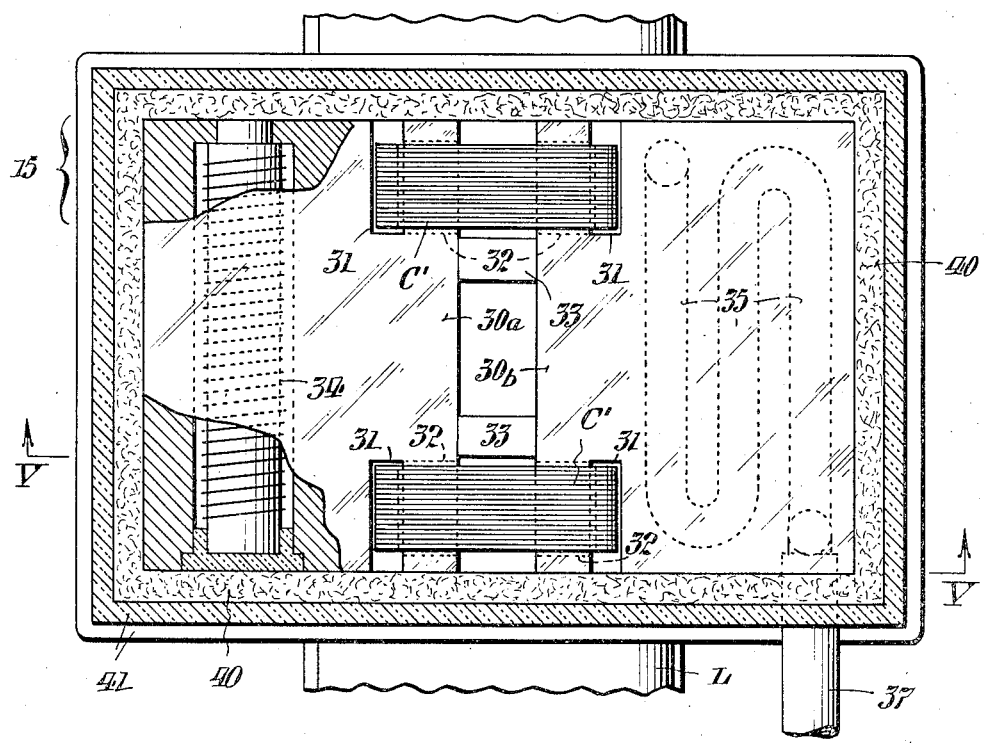
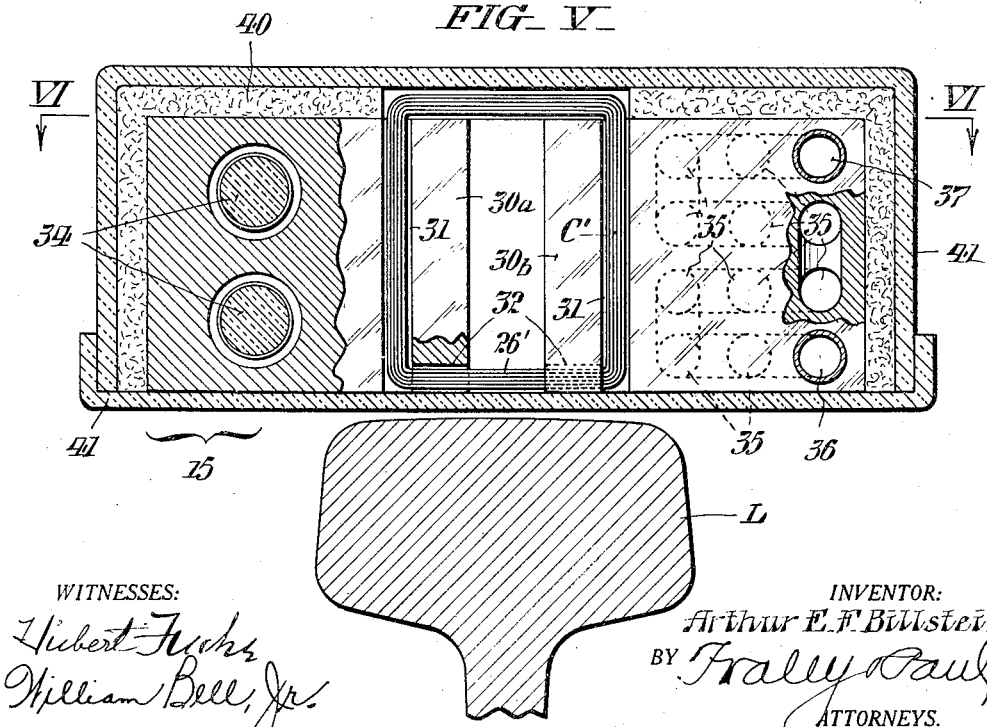

Patented Nov. 10, 1936

2,060,458

UNITED STATES PATENT OFFICE 2,060,458

RAIL-FLAW DETECTOR

Arthur E. F. Billstein, Altoona, Pa., assignor to The Pennsylvania Railroad Company, Philadelphia, Pa., a corporation of Pennsylvania Application August 21, 1935, Serial No. 37,160

5 Claims. (Cl. 175—183)

This invention relates to the electrical and magnetic testing of railroad rails, and of other metal objects, shapes, or sections, for the detection of defects such as cracks, internal fissures and flaws, "pipes", etc., or even superficial deformities or blemishes like rail burns. Besides rails, the invention is of especial advantage in testing long lengths of almost any section, such as bars, rods, tubes, strips, wires, and the like.

In the magnetic testing of rails or other metal objects, the test piece is in a magnetic field, which permeates the test piece and is itself influenced or modified by the presence and structure of the test piece. Such a field may be produced by passing a suitable electric current through the rail or object. Any local peculiarity of form or structure in the object—whether external or internal—produces corresponding distortion of the magnetic field. To locate such peculiarities or defects in the object, therefore, it suffices to pass along it a suitable "detector" device in which electric current or electrical impulse(s) will be produced by the magnetic field or its variations; so that the peculiarities or defects of the object are manifested by resultant current-variations or electrical impulses in the detector circuit. One such detector is shown and described in my United States Patent No. 1,963,931, granted June 19, 1934. The electrical current variations or impulses in the detector circuit can be suitably amplified to afford power for producing any desired indication or record, such as a bell or buzzer signal, a graphic record on a paper tape, or even a mark on the defective portion of the object. It is, of course, immaterial whether the object moves past the detector, or the detector along the object. But in testing rails in a railroad track, it is generally convenient to mount the detector and the associated equipment on one or more railway cars and to haul or propel the car(s) along the track, testing both the track rails at the same time.

My present invention relates to a detector operating upon principles similar to those of my said Patent No. 1,963,931, but capable of greater efficiency and sensitiveness. Various features and advantages of the invention will appear from the description hereinafter of species and a form of embodiment of the invention, and from the drawings. So far as novel over the art, indeed, all the features hereinafter described are of my invention.

In the drawings, Fig. I is a fragmentary and somewhat diagrammatic side view of a railway track inspection car equipped with rail-testing equipment including my detector.

Fig. II is a diagrammatic perspective view illustrating the electric circuit and connections of the detector.

Fig. III is a fragmentary perspective view illustrating a structural detail.

Fig. IV is a view similar to Fig. II illustrating a modification.

Fig. V shows a cross-section through the detector, taken as indicated by the line and arrows V—V in Fig. I.

Fig. VI is a plan sectional view, taken as indicated by the line and arrows VI—VI in Fig. V, with certain parts partly broken away.

Fig. VII is a fragmentary bottom plan view of parts of the detector, part of the coil shown being broken away.

Fig. I shows a track rail L and an inspection car 9, with truck wheels 10, 10, running on said rail. For passing electric current through the rail or test piece L and thus producing a magnetic field, there is shown a (direct current) generator 11 whose terminals are connected by circuit leads 12, 12 to rail-engaging contact-brushes 13, 13 in brush-holders 14, 14. Between the brushes 13, 13, closely adjacent the rail or test piece L, is the detector 15 of my present invention, connected in a circuit 16 in which electric current variations or impulses are created by the magnetic field distortion due to rail defects, when the detector 15 travels along the rail or test piece L,—or vice-versa, when the test piece L moves past the detector 15. Indicating means 17 responsive to impulses from the detector 15 are shown connected across an indicating circuit 18, between which and the detector circuit 16 may be interposed an amplifier or amplifying system 19. Brushes 13, 13 and detector 15 may be mounted on a carriage or carrier 20 which is arranged for up and down movement in vertical ways 21, 21 depending from the car 9, and is provided with guide wheels 22, 22 to run on the rail L. Any suitable mechanism or tackle may be provided for raising and lowering the carriage 20 and the parts carried thereby, either to clear obstructions along the track or when not engaged in testing the track on which the car 9 is running: in the present instance, cables 23, 23 are shown extending up and around pulleys 24, 24 on the platform of the car 9. Provision may be made for resilient pressure of the brushes 13, 13 against the head of the rail L—partly or wholly by the springiness of the brushes themselves acting against the weight of the carriage 20, for example.

The detector of my present invention depends upon the fact that when a temperature difference or gradient and a magnetic field coexist along the length of a magnetic wire (a wire of any magnetizable metal, including iron, nickel, and various nickel-iron or other alloys), there is an electromotive force in the wire. The direction of this force is independent of the direction of the magnetic field, but does depend on the direction of the temperature gradient: For a nickel wire, the cold end of the wire is positive and the hot end negative. The magnitude of the force depends on the magnetization as well as on the temperature difference. The electromotive force appears to be a maximum when the temperature of half the length of the wire is above the Curie point, and that of the other half below. See "Annalen der Physik", 5 Folge, 1932, Band 14, Heft 3, pp. 259–272, as well as 4598 "Science Abstracts". While a variation in the magnetic field generally changes the electromotive force, the phenomenon is quite distinct from ordinary electric-current induction in a changing magnetic field, as well as from the variation of electrical resistance with temperature, and from the thermocouple principle.

Fig. II, illustrating one very simple form of my detector, shows a short piece of rail L through which current is flowing so as to create around the rail a magnetic field,—such as suggested by the arrows in the plane of the cross-hatched cross-section, as well as by the two groups of arcs of lines of force $f, f$ just above the top surface of the rail head. A detector wire 25 of magnetic metal, such as nickel, is shown arranged with two more active (parallel) portions 26, 26 spaced apart but close to the rail L, each extending substantially in the direction of the magnetic field as represented by the arcs of lines of force $f, f$. The active detector-wire sections or elements 26, 26 should be spaced far enough apart to assure that they will not be concurrently affected by magnetic field distortion due to one and the same rail-defect D: e. g., about six in., more or less. The detector-circuit leads 16, 16 of non-magnetic metal (such as copper) connect the ends of this nickel wire 25 to the amplifier 19. Preferably, the intermediate part of wire 25 between its more active portions 26, 26 extends at 26a, 26a (upward) away from the rail L, so that the mid-portion 25a paralleling the rail lies out of that part of the magnetic field which is close enough to the rail to be subject to distortion by a defect D in the rail,—even such a defect close to the top surface of the rail-head. As shown, the non-magnetic leads 16, 16 are not connected directly to the corresponding ends of the more active portions 26, 26, but to extensions 26b, 26b of the latter (upward) away from the rail L,—at about the same distance away as the intermediate part 25a. Thus each portion 26, 26 and its extensions 26a, 26b constitute a flat, rectangular "coil" C of a single turn or convolution, these coils being arranged upright or in planes perpendicular to the rail L, and being serially interconnected by the portion 25a. Legends "Hot" and "Cold" at opposite sides of these coils C, C in Fig. II indicate regions of different temperature affecting the portions 26a, 26a and 26b, 26b, so as to create and maintain a temperature gradient along each more active portion 26, 26 of the detector wire 25. However, the junctions 27, 27 of detector wire 25 with both leads 16, 16 are not subject to different temperatures, so that thermocouple effects in the detector circuit 16, 16 are avoided. In practice, the junctions 27, 27 of leads 16, 16 with wire 25 may be altogether outside the "Hot" and "Cold" regions of Fig. II, in such a region and in such close proximity to one another as will assure like temperatures for said junctions 27, 27.

As shown in Fig. II, the leads 16, 16 do not extend from their junctions 27, 27 with detector wire 25 directly to the amplifier, but extend close along the corresponding upright "coils" C, C of the wire 25, and also (in the case of the lead 16 for one coil) along the intermediate coil-connecting portion 25a of wire 25. Of course the leads 16, 16 are suitably insulated (or separated) from the detector wire 25, so as not to short-circuit it. Thus induced currents in the detector 15 due to variations or distortions of the magnetic field are eliminated or "cancelled out". To assure this absolutely, the wire 25 and its paralleling leads 16, 16 may be twisted together as indicated in Fig. III. Obviously, of course, the portions 26a, 26b, and 25a of the detector wire 25 need not necessarily be of magnetizable metal, since they function mainly as current leads; but to make all these portions of one and the same piece of (magnetizable) wire is generally the simplest way of insuring against trouble from possible thermocouple effects in the detector wire 25.

From Fig. II and the foregoing description, it is apparent that each more active portion 26 of the detector wire 25 has therein an electromotive force due to the temperature gradient above described and the magnetic field indicated at $f$ and $f$. For a wire 25 of nickel, the direction of each such electromotive force will be from cold to hot, as indicated by the arrowheads on the portions 26, 26; and hence these forces will oppose each other in the detector circuit 16, 16. So long, therefore, as the magnetic fields at $f, f$ are alike, these electromotive forces will counterbalance or neutralize each other. If, however, there is a defect D in the rail L at a point in the field $f$ affecting one of the portions 26, 26 of the wire 25, then the electromotive force in one of said portions 26, 26 will differ from that in the other, and there will be a consequent flow or "rush" of current—an electric impulse, in other words—in the detector circuit 16, 16, giving rise to actuation of the indicator 17 to indicate such defect D when the detector 15 passes it.

In the detector shown in my Patent No. 1,963,931, there is a single coil of magnetic wire in a horizontal plane, substantially parallel with the top surface of the rail-head; whereas in my present detector 15 as above described, there are serially connected coils in vertical planes. With the interconnection 25a of these coils beyond the range of field distortion due to a defect D as described above, there will be no magnetic path interconnecting the wire portions 26, 26, so that the magnetic fluxes of the fields $f, f$, cannot divide between the wire portions 26, 26, thus tending to reduce the difference between these magnetic fluxes and the consequent electromotive force and electrical impulse (s) in the detector circuit 16, 16. Hence this detector is more sensitive than that shown in my said patent. Furthermore, when it is desired to have a number of turns of the wire 25 in each vertical coil C (instead of the single turn shown in Fig. II), in order to have a number of serially connected portions 26 acting cumulatively, it is easier to bring a maximum number of such portions 26 of each vertical coil C very close to the rail L, where the magnetic distortion due to a defect D is most felt, than it is in the case of a single horizontal coil such as shown in my said patent. This will be clearer from Figs. V—VII, to be presently described.

Fig. IV illustrates a modification of the detector 15 shown in Fig. II, in which the active wire portions 26, 26 are bent or curved upward substantially into alignment or correspondence with the lines of force in the fields at f, f. As only the portions or components of the field fluxes along the wire portions 26, 26 have any influence in producing electromotive forces in them, their curvature as indicated in Fig. IV utilizes these fluxes with maximum efficiency and at maximum (opposing) values.

Figs. V, VI, and VII illustrate one embodiment of my present invention in a construction generally similar to that shown in my said Patent No. 1,963,931. As shown, there are two coils C', C' arranged in vertical planes, and mounted on suitably separated thermo-conductive members or blocks 30a, 30b, in vertical grooves 31, 31 in the opposite ends of said members,—which may be of copper or even of silver. Each coil C' comprises a multiplicity of turns of the (nickel) detector wire,—with the associated (copper) lead wire entwisted therewith as in Fig. III. The lower portion 26' of each coil C', embodying the more active portions of the detector wire convolutions, may be accommodated in transverse grooves 32, 32 in the bottoms of members 30a, 30b. The members 30a, 30b are shown separated by (thermo-insulative) spacers 33, 33 and dead airspaces, as one illustrative means of thermally isolating or insulating them from one another to minimize exchange of heat between them. Any suitable means may be provided for heating one of the member 30a, 30b and for cooling the other: e. g., electric heating-coil units 34, 34 in suitable longitudinal bores in the member 30a, extending parallel with the rail L, and duct(s) 35 for the circulation of water or other cooling or refrigerating medium in the member 30b. As shown, the ducts 35 are serially interconnected in the member 30b in sinuous or zig-zag horizontal courses which are in turn interconnected alternately at left and right and front and rear,— speaking with reference to the relations of parts in Figs. V and VI. Supply and return pipe connections 36 and 37 are shown (see also Fig. I) for circulating the cooling medium through the ducts 35 from any suitable cooling or refrigerating means 38 on the car 9. Leads 39, 39 are shown in Fig. I for supplying heating current from any suitable source to the heaters 34, 34.

On its top and its vertical sides, the assembly of members 30a, 30b and coils C', C' is covered with (dielectric) heat-insulation 40,—except for the upper horizontal portions of the coils C', C', which lie in openings in the insulation. An outer casing 41 of paramagnetic material encloses the whole device.

The detector 15, thus encased, may be about $\frac{1}{32}$ to $\frac{1}{16}$ in. above the top surface of the railhead,—about as close as consistent with satisfactory clearance in service, in other words, so as to bring the horizontal portions 26', 26' of the coils C', C' into the maximum influence of magnetic distortions due to defects in the rail L. The horizontal distance between the coils C', C' may be some five or six inches or more, to assure that they shall not be concurrently affected by the magnetic field distortion due to one and the same rail defect. The height of the coils C', C' may preferably exceed 2½ in. between their lower and upper horizontal portions, so that the latter shall be well above the region or range of magnetic distortion due to rail defects (which extends some 2 in. more or less above the rail-head, according to the current strength in the rail), and hence unaffected by such distortions, which would otherwise tend to create electromotive forces in the upper convolutions of the coils opposing those in their lower convolutions.

From Figs. V and VI it will be seen how a vertical arrangement of coils C', C' which are wound to have an oblong (flat) cross-section as usual brings the cumulatively acting active portions 26', 26' of their convolutions nearer the railhead than does the horizontal arrangement of the coil shown in my said patent: i. e., the greater dimension of the oblong cross section of the coil extends along the rail L instead of perpendicular to it. Thus the (opposing) electromotive forces in these coils C', C' have maximum values. It will also be apparent how much more easily and satisfactorily the lower portions 26', 26' of these vertically arranged coils C', C' can be bent or curved upward as in Fig. IV than can the corresponding portions of the horizontal coil in said patent.

Having thus described my invention, I claim:

1. A rail flaw detector of the character described, for testing a rail by relative motion of detector and rail lengthwise of the latter in a a magnetic field such as produced by flow of current along the rail, comprising spaced elements of magnetic metal arranged transversely of the rail or test-piece within the range of distortion of the magnetic field due to rail flaws, means for maintaining a temperature gradient along each of said elements, said elements being serially connected in circuit outside the range of distortion of the magnetic field due to defects in the test piece, so that electromotive forces in said elements due to the magnetic field and the temperature gradient oppose one another, and only inequalities of these electromotive forces due to flaws in the test piece produce electrical impulses in the detector circuit including said serially connected coils.

2. A rail flaw detector of the character described, for testing a rail by relative motion of detector and rail lengthwise of the latter in a magnetic field such as produced by flow of current along the rail, comprising spaced elements of magnetic metal arranged transversely of the rail or test-piece within the range of distortion of the magnetic field due to rail flaws and bent away from the rail into substantial alignment with the magnetic flux around it, means for maintaining a temperature gradient along each of said elements, said elements being serially connected in circuit outside the range of distortion of the magnetic field due to defects in the test piece, so that electromotive forces in said elements due to the magnetic field and the temperature gradient oppose one another with maximum values, and only inequalities of these electromotive forces due to flaws in the test piece produce electrical impulses in the detector circuit including said serially conected coils.

3. A rail flaw detector of the character described, for testing a rail by relative motion of detector and rail lengthwise of the latter in a magnetic field such as produced by flow of current along the rail, comprising spaced coils of magnetic wire arranged in planes transverse to the rail or test-piece with portions of their convolutions closely adjacent the rail within the range of distortion of the magnetic field due to rail flaws, means for maintaining a temperature gradient along said portions of said coils closely adjacent the rail, said coils being serially connected in circuit so that electromotive forces in said coils due to the magnetic field and the temperature gradient oppose one another, and inequalities of these electromotive forces due to flaws in the test piece produce electrical impulses in the detector circuit including said serially connected coils.

4. A rail flaw detector of the character described, for testing a rail by relative motion of detector and rail lengthwise of the latter in a magnetic field such as produced by flow of current along the rail, comprising spaced coils of magnetic wire arranged in planes transverse to the rail or test-piece with portions of their convolutions closely adjacent the rail within the range of distortion of the magnetic field due to rail flaws and with opposite portions of their convolutions more remote from the rail and beyond such range, means for maintaining a temperature gradient along said portions of said coils closely adjacent the rail, said coils being serially connected in circuit outside the range of distortion of the magnetic field due to defects in the test piece, so that electromotive forces in said coils due to the magnetic field and the temperature gradient oppose one another, and only inequalities of these electromotive forces due to flaws in the test piece produce electrical impulses in the detector circuit including said serially connected coils.

5. A rail flaw detector of the character described, for testing a rail by relative motion of detector and rail lengthwise of the latter in a magnetic field such as produced by flow of current along the rail, comprising spaced coils each comprising a plurality of convolutions of magnetic wire arranged in planes transverse to the rail or test-piece with portions of their convolutions closely adjacent the rail within the range of distortion of the magnetic field due to rail flaws and arranged in an oblong cross-section with its greater dimension extending lengthwise of the rail, means for maintaining a temperature gradient along said portions of said coils closely adjacent the rail, said coils being serially connected in circuit so that electromotive forces in said coils due to the magnetic field and the temperature gradient oppose one another with maximum values, and inequalities of these electromotive forces due to flaws in the test piece produce electrical impulses in the detector circuit including said serially connected coils.

ARTHUR E. F. BILLSTEIN.